Jan. 27, 1953   F. B. ALLEN   2,627,064
SMOKE DETECTOR TESTING MEANS
Filed July 15, 1950   2 SHEETS—SHEET 1

INVENTOR.
FRANK B. ALLEN
BY Edward T. Connors
ATTORNEY.

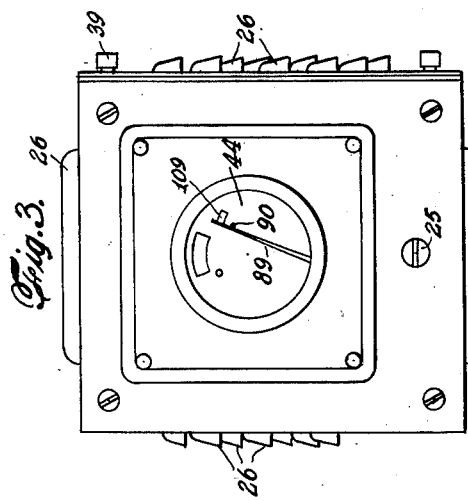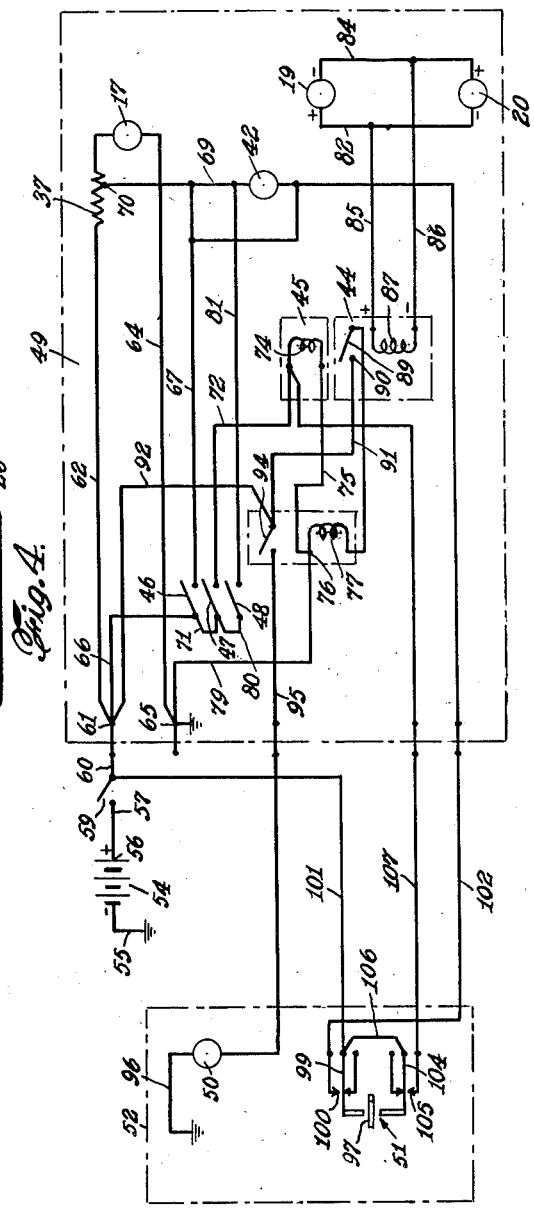

Patented Jan. 27, 1953

2,627,064

UNITED STATES PATENT OFFICE 2,627,064

SMOKE DETECTOR TESTING MEANS

Frank B. Allen, Towaco, N. J., assignor to C-O-Two Fire Equipment Company, Newark, N. J., a corporation of Delaware Application July 15, 1950, Serial No. 174,037

6 Claims. (Cl. 340—237)

The present invention relates to a smoke detector and particularly to means for testing the detector to simulate the working condition thereof.

The detector is used for detecting smoke in a compartment of an airplane or other space and is generally positioned near the hazard to be protected. In some cases the fluid to be tested for smoke is circulated through the detector by natural thermal currents in the atmosphere aided by the thermal movement of heated fluid through the detector. In other cases the fluid is circulated through the detector by suction pumps or blowers.

It is important that the detector be in proper operating condition at all times and periodic inspections and tests are made to promptly detect a failure or improper adjustment of the parts of the detector. Heretofore, in some cases, tests have been made of the operability of the detector by passing smoke through it to check its operation. However, this is an expensive and time consuming test always presenting the possibility that damage may be caused to the furnishings or structure about the detector, and, further testing by the use of smoke may result in the deposit of condensed particles of smoke within the detector to lessen the sensitivity thereof.

The present invention aims to provide a smoke detector and means for testing same under conditions simulating those in actual use. The various elements, circuit connections and indicating means may all be tested without disturbing any of the connections or adjustments.

Another object of the invention is to provide a testing circuit which may be built in the detector upon its manufacture.

Another object of the invention is to provide smoke detector testing means which may be operated from a remote location.

In accordance with the invention, the foregoing objects are accomplished by providing a smoke detector having means responsive to light variations caused by particles of smoke and incorporating in the detector light producing means to act on the responsive means to simulate the condition when smoke is present. Additionally the electric current for the actuation of a testing light may be drawn through the main light source of the detector to test its operability. Also a current limiting means used to increase the life of the main light source and to provide potential for the testing light may be utilized to provide a test of the adjustment of the detector for varying voltage conditions.

The construction in accordance with the invention is particularly advantageous in that none of the circuit connections or adjustments are disturbed in making the test, furthermore no additional power supply is necessary, nor is there any chance of causing damage as by the use of smoke.

Other objects and advantages of the invention will be apparent from the following description and from the accompanying drawings which show, by way of example, an embodiment of the invention.

In the drawings:

Figure 3 is an end view of the device.

Figure 4 is a schematic wiring diagram illustrating the electrical connections of the device.

Figure 1:
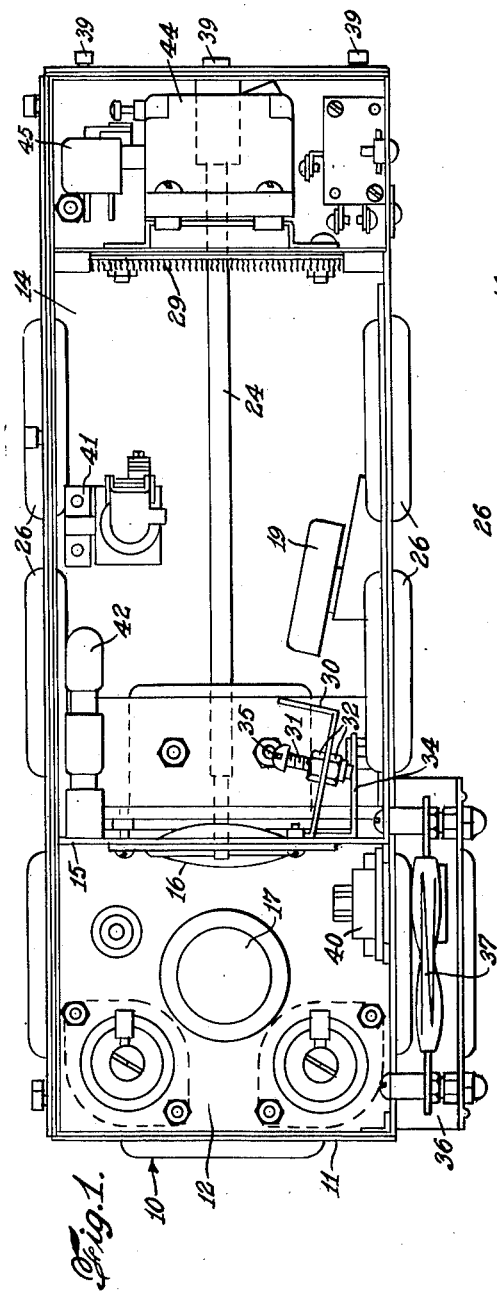
Figure 1 is a top view of a device in accordance with the invention with the cover of the device removed.
Figure 2:
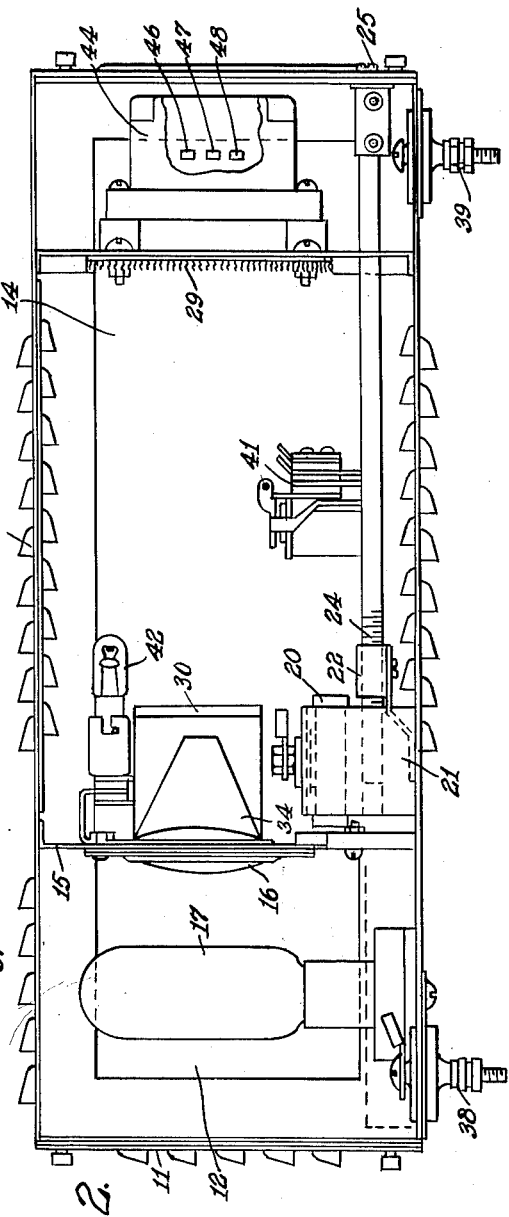
Figure 2 is a side view of the device shown in Figure 1 with the side removed.

Referring to the drawings, there is shown in Figures 1 through 3, a smoke detector 10 incorporating a test circuit made in accordance with the invention. The smoke detector comprises a casing 11 divided into a light source compartment 12 and a detecting compartment 14, separated by a partition 15 carrying a lens 16. An electric lamp 17 is positioned in the light source compartment 12 with its filament in alignment with the lens 16 so as to project a beam of light into the detecting compartment 14.

Within the detecting compartment is a main photoelectric element 19 and a balancing photoelectric element 20. The main photoelectric element 19 is positioned to one side of the beam of light and preferably is turned at a slight angle so as to minimize the amount of stray light falling on the surface thereof. The balancing photoelectric element 20 is faced downwardly against the bottom of the detecting compartment opposite a portion of unpainted surface thereof having good reflective quality. The balancing element is connected in opposition with the main element in order to counteract the amount of stray light acting on the main photoelectric element. In order to adjust the effect of the balancing element, a shutter 21 having a non-reflecting light coating is slideably movable over the reflecting surface to vary its area. The shutter 21 is attached to a nut 22 threadedly engaged with a bolt 24 having a slotted head 25 extending from the exterior of the detector.

The flow of fluid such as air to be tested for smoke takes place through louvers 26 positioned in the top and side walls of the detector. The movement of the fluid through the louvers occurs partially by the natural thermal currents in the atmosphere about the detector and is aided by the movement of heated fluid through the detector, the heating of the fluid caused by heat transmitted through the walls of the detector and from the beam of light in the detecting space. In other constructions, a detecting compartment with closed walls might be used having piped connections to the space being protected and wherein the circulation of the fluid is by means of a suction pump or blower.

Opposite the lens 16 in the detecting compartment 14, is a light absorbing material 29 such as a piece of dark colored carpeting to absorb the light and prevent its reflection or refraction to the surface of the main photoelectric element. The sensitivity of the detector is adjusted by varying the width of the beam of light by means of a shutter adjustably positioned by a screw 31 engaging the shutter 30 between locking nuts 32 and abutting against an angle support 34. The head of the screw 31 is slotted as indicated at 35 to facilitate manipulation of the screw to move the shutter 30 into or out of the path of the beam of light to vary the cross-sectional area of the beam of light depending upon the sensitivity desired.

At one side of the light compartment is a housing 36 enclosing a resistor 37 in series with the light 17. The resistor produces a considerable amount of heat which is preferably dispensed exteriorly of the detector casing 11. The detector casing 11 is supported in a desired position by shock-proof mounting 38 of any suitable construction.

In order to facilitate inspection of the parts of the detector, the side and top walls are easily removed by the disengagement of quick-release fittings 39 of any conventional construction.

In order to provide for the connection of wires to a remote control test station and to a power supply, the light source compartment is made with a cable bushing 40. The detector casing is shown without wiring to simplify the illustration, it being believed that the various wiring connections are quite apparent from the schematic wiring diagram shown in Figure 4. At one side of the detecting compartment 14 is mounted a power relay 41 which will be later described in connection with the circuit diagram. Adjacent the top of the detecting compartment 14 and opposite the face of the main photoelectric element 19 is positioned a testing lamp 42 of comparatively low wattage. At the end of the casing 11, opposite the light compartment 12, is a space for a sensitive relay 44 having a meter type mechanism so that its contacts are gradually closed as the applied voltage is gradually increased; thus, it is possible to maintain the relay contact in a "floating" position by applying an appropriate voltage to its operating coil. At one side of the sensitive relay 44 is positioned a solenoid resetting relay 45, and at the other side of the sensitive relay are switches 46, 47 and 48 for purposes to be later described.

The circuit diagram of the detector and the testing circuit is shown in Figure 4, the portion of the wiring diagram within the detector casing 11 being indicated by the dash-dot rectangular enclosure 49 while a remotely positioned alarm signal 50 and a remote control test station 51 is shown as enclosed by the dash-dot enclosure 52.

A source of electrical current is provided by a battery 54 having one terminal 55 grounded while its other terminal 56 is connected by a wire 57 to a main switch 59 which is preferably located so as to prevent the possibility of its becoming accidentally opened while the detector is in use. A supply wire 60 connects the switch 59 to a terminal 61 within the detecting casing 11. A wire 62 connects the terminal 61 with the resistor 37 in series with the lamp 17 and thence through a wire 64 to a grounded terminal 65 of the casing. The supply terminal 61 is also connected by a wire 66 to one side of the test switch 46 connected by a wire 67 to one side of the test light 42, the other side of the test lamp 42 being connected by a wire 69 to a tap 70 on the resistor 37 so that the voltage drop across a portion of the resistor 37 may be applied to the test lamp 42 upon the closing of the switch 46.

The supply wire 66 is connected by a jumper 71 to the live side of the reset switch 47 connected through a wire 72 to a relay coil 74 of the reset relay 45. The other terminal of the relay coil 74 is connected by a wire 75 to a terminal 76 of an alarm power relay 77 and thence to the ground terminal 65 by a wire 79. A jumper 80 connects the live side of the switch 47 to the live side of the zero test switch 48, the other side of the test switch being connected by a wire 81 to the wire 69 so as to provide, upon the closing of the switch 48, of a by-pass for the resistor 37.

The main photoelectric element 19 and the balancing photoelectric element 20 are connected in opposed relationship by wires 82 and 84 and parallel by wires 85 and 86 with opposite ends of a coil 87 of the sensitive relay 44. The armature of the sensitive relay carries a switch blade 89 adapted to engage a contact 90 connected by a wire 91 to the supply terminal 61 to a wire 92 and through a blade 94 of the alarm power relay 77 and a wire 95 to the alarm signal 50 and thence to ground through a wire 96.

The remote control test switch 51 is preferably actuated by a single double-throw operating member 97 adapted to be moved upwardly to test the operation of the detector, and to be moved downwardly to reset the relay. The remote control test switch has its contacts connected in parallel with the contacts of the test switches 46 and 47 and thus accomplishes the same test from a remote location. The operating member 97 is adapted when moved upwardly to close a switch blade 99 against a contact 100. The switch blade 99 is connected to the supply switch 59 by wire 101 while the contact 100 is connected by a wire 102 to one side of the test lamp 42, in effect, across the switch 46. The operating member 97 is adapted, when moved downwardly, to move a switch blade 104 against a contact 105. The switch blade 104 is connected by a jumper 106 to the supply wire 101 while the contact 105 is connected by a wire 107 to one side of the coil 74 of the resetting relay 45, in effect, across the switch 47.

In operating a detector with a test circuit in accordance with the invention, it is installed in a suitable location and connected to a power supply 54. The main supply switch 59 is closed energizing the light source 17 through the resistor 37. The output of the balancing photoelectric element 20 is varied by adjusting the shutter 21 so that the switch blade 89 is spaced intermediate its zero position and the contact 90. The desired sensitivity of the detector is achieved by adjusting the screw 31 to move the shutter 30 into or out of the beam from the lens 16. In the event smoke is present in the fluid being tested, light from the beam entering the detecting compartment 14 through the lens 16 is reflected to the face of the main photoelectric element 19. A current is then caused to flow through the wires 85 and 86 and the relay coil 87 to close the switch blade 89 against its contact 90 causing the alarm signal 50 to operate.

In testing the detector, the test lamp 42 is energized so that it transmits light to the face of the photoelectric element 19 simulating the condition wherein light is reflected from particles of smoke in the beam of light. If desired, the strength of the light emitted by the test lamp 42 may be varied by coating the surface of the light bulb, by inserting a resistance in series therewith, or by choosing a filament of such wattage so that a light of desired intensity will be emitted. Accordingly, means are provided for testing the sensitivity of the detector as well as for testing its operability.

In testing the operability of the detector, the test switch 46 is closed energizing the test lamp 42 from the voltage drop across the resistor 37. The light falling on the surface of the photoelectric element 19 results in the production of a signal by the alarm signal 50. The relay 44 is provided with a magnet 109 to hold its contacts in the closed position after contact has once been made. Thus, it is necessary to physically break the connection of the switch blade 89 and its contact 90. This is accomplished by closing the reset switch 47 energizing coil 74 of the resetting relay 45 to separate the contacts 89 and 90.

A testing operation may be performed at a remote location from the detector 10 by actuating the remote control switch 51. Movement of the single operating member 97 into an upward position closes the test switch contacts energizing the test lamp 42 causing a simulated operation of the detector. The detector may be reset by actuating the operating member 97 downwardly to energize the resetting relay 45 to separate the contacts 89 and 90 as before described.

In addition, a test may be made of the operability of the detector under voltage conditions by actuating the zero test switch 48 which completes a connection by-passing the resistance 37 and thus increasing the voltage applied to the lamp 17 thereby increasing its output. In the event the photoelectric elements are in proper condition and adjustment, such an increase in light increases the output of the photoelectric element 19 which is counterbalanced by an increase in the output of the balancing photoelectric element 20 thereby producing an equalized condition resulting in no operation of the sensitive relay 44.

While a structure has been illustrated which may be operated by a series of steps to accomplish a test of the detector, other constructions might be utilized to produce a like result; for example, while the actuation of the detector has been accomplished by the use of a test lamp 42, an alternative construction might utilize light from the main source 17 reflected to the surface of the main photoelectric element 19 by a reflecting surface which might be manipulated into test or reflecting position by a relay or other suitable means. Likewise, a test operation of the detector might be had by providing a closure opening in the casing opposite the main photoelectric element 19 so that a test operation might be accomplished by the use of an exterior means such as a flashlight or other portable source of light. While such an arrangement would not simultaneously provide for an operation check of the light source 17, the other elements of the detector would be tested.

It is thus apparent that a smoke detector testing means has been provided which is simple in construction and dependable in use.

While the invention has been described and illustrated with reference to a specific embodiment thereof, it will be understood that other embodiments may be resorted to without departing from the invention; therefore, the form of the invention set out above should be considered as illustrative and not as limiting the scope of the following claims.

I claim:

1. A smoke detector including means responsive to light reflected from smoke and means to test the entire operation of the smoke detector comprising switch means, electric circuit means, and a test lamp connected through the switch to the electric circuit, the test lamp positioned to transmit light to the responsive means whereby the switch may be actuated to simulate the condition wherein light is reflected from smoke to test the operation of the smoke detector.

2. A smoke detector comprising a light source, a photoelectric element responsive to light from the source, electrically responsive indicating means connected in a circuit with the photoelectric element, switch means, and a test lamp positioned to transmit light to the photoelectric element, whereby the switch means may be operated to test the entire operability of the smoke detector.

3. A smoke detector comprising a light source, a photoelectric element responsive to light from the source, electrically responsive indicating means connected in a circuit with the photoelectric element, a resistance connected in series with the light source, a test lamp connected across the resistance and positioned to transmit light to the photoelectric element, and switch means connected in series with the test lamp whereby the entire operation of the smoke detector may be tested by closing the test lamp switch.

4. A smoke detector comprising a light source to produce a beam of light, a main photoelectric element responsive to light from the light source, a balancing photoelectric element connected in opposition with the main photoelectric element to compensate for the effect of stray light thereon, means for conducting a stream of fluid into the light beam to vary the effect of the light on the main photoelectric element, electrical responsive means, means connecting the photoelectric elements in an electrical circuit with the electrical responsive means to indicate the variation in the light, a test lamp positioned to transmit light to the main photoelectric element, and switch means to connect the test lamp in an electric circuit to test the entire operation of the smoke detector.

5. A smoke detector comprising an electric lamp to produce a beam of light, a main photoelectric element responsive to light from the lamp, a balancing photoelectric element connected in opposition with the main photoelectric element to compensate for the effect of stray light thereon, means for conducting a stream of fluid into the light beam to vary the effect of the light on the main photoelectric element, electrical responsive means, means connecting the photoelectric elements in an electrical circuit with the electrical responsive means to indicate the variation in the light, a resistor in series with the light source, a test lamp connected across the resistor and positioned to transmit light to the main photoelectric element, and switch means in the test lamp circuit to light the test lamp to test the entire operation of the smoke detector.

6. A smoke detector comprising an electric lamp to produce a beam of light, a main photoelectric element responsive to light from the lamp, a balancing photoelectric element connected in opposition with the main photoelectric element to compensate for the effect of stray light thereon, means for conducting a stream of fluid into the light beam to vary the effect of light on the main photoelectric element, electric responsive means, means connecting the photoelectric elements in an electrical circuit with the electric responsive means to indicate the variation in the light, a resistor in series with the electric lamp, and switch means to by-pass the resistor to increase the brilliancy of the electric lamp to test the entire operation of the smoke detector under a condition of variation in voltage.

FRANK B. ALLEN.

REFERENCES CITED

The following references are of record in the file of this patent:

UNITED STATES PATENTS

| Number | Name | Date |
|---|---|---|
| 1,828,894 | Freygang | Oct. 27, 1931 |
| 1,988,274 | Glaser | Jan. 15, 1935 |
| 2,455,351 | Beam et al. | Dec. 7, 1948 |
| 2,474,221 | Cahusac | June 28, 1949 |
| 2,476,958 | Cahusac et al. | July 26, 1949 |